US 10,379,372 B2

(12) United States Patent
De Beule et al.

(10) Patent No.: US 10,379,372 B2
(45) Date of Patent: Aug. 13, 2019

(54) VIBRATION DAMPING CONNECTOR AND USE OF THE VIBRATION DAMPING CONNECTOR

(71) Applicant: INL—International Iberian Nanotechnology Laboratory, Braga (PT)

(72) Inventors: Pieter De Beule, Braga (PT); Adelaide Miranda, Braga (PT); Marco Martins, Braga (PT)

(73) Assignee: INL-INTERNATIONAL IBERIAN NANOTECHNOLOGY LABORATORY, Brago (PT)

(*) Notice: Subject to any disclaimer, the term of this patent is extended or adjusted under 35 U.S.C. 154(b) by 0 days.

(21) Appl. No.: 15/743,116

(22) PCT Filed: Jul. 12, 2016

(86) PCT No.: PCT/EP2016/066521
§ 371 (c)(1),
(2) Date: Jan. 9, 2018

(87) PCT Pub. No.: WO2017/021108
PCT Pub. Date: Feb. 9, 2017

(65) Prior Publication Data
US 2018/0231794 A1 Aug. 16, 2018

(30) Foreign Application Priority Data
Aug. 6, 2015 (EP) .................................. 15179924

(51) Int. Cl.
F16M 11/00 (2006.01)
G02B 27/64 (2006.01)
(Continued)

(52) U.S. Cl.
CPC ............ G02B 27/646 (2013.01); F16F 15/08 (2013.01); G01Q 30/025 (2013.01); G02B 7/14 (2013.01);
(Continued)

(58) Field of Classification Search
CPC .. F16F 15/08; F16F 1/3732; F16F 7/00; F16F 15/022
(Continued)

(56) References Cited

U.S. PATENT DOCUMENTS 2,924,419 A 2/1960 Wells
3,474,992 A 10/1969 Schuck et al.
(Continued)

FOREIGN PATENT DOCUMENTS

EP 1 726 846 A1 11/2006

OTHER PUBLICATIONS

Extended European Search Report for European Application No. 15179924.4, dated Feb. 26, 2016.
(Continued)

Primary Examiner — Steven M Marsh
(74) Attorney, Agent, or Firm — Xsensus, LLP

(57) ABSTRACT

The present invention refers to a vibration damping connector (100) for reducing vibrations between a vibration prone system and an optical imaging system, said vibration damping connector comprising
a first part (1) adapted to be connected to said optical imaging system,
a second part (2) adapted to be connected to said vibration prone system, and
at least one first shock absorbing element (3), a portion of said first part (1) is arranged inside a portion of said second part (2) along a central axis (A) or a portion of said second part (2) is arranged inside a portion of said
(Continued)

first part (1) along a central axis (A) and said at least one flexible shock absorbing element (3) is arranged between said first part (1) and said second part (2), said vibration damping connector (100) further comprises at least one fastening device (4) for fastening said first part (1) to said second part (2) and said fastening device (2) presses said first part(1) to said second part (2) via a second shock absorbing element (5). Furthermore, use of the vibration damping connector, in an optical system is disclosed.

17 Claims, 4 Drawing Sheets

(51) Int. Cl.

| | |
|---|---|
| *G01Q 30/02* | (2010.01) |
| *G02B 7/14* | (2006.01) |
| *G02B 21/36* | (2006.01) |
| *F16F 15/08* | (2006.01) |
| *G02B 21/00* | (2006.01) |

(52) U.S. Cl.
CPC ...... *G02B 21/362* (2013.01); *F16F 2226/042* (2013.01); *F16F 2230/0005* (2013.01); *F16F 2234/04* (2013.01); *G02B 21/0088* (2013.01)

(58) Field of Classification Search
USPC .................................. 248/560, 621, 632, 634
See application file for complete search history.

(56) References Cited

U.S. PATENT DOCUMENTS

| | | | | |
|---|---|---|---|---|
| D559,083 | S * | 1/2008 | Brassard | D8/354 |
| 7,487,958 | B2 * | 2/2009 | Wang | B01F 9/0001 188/378 |
| 7,503,552 | B2 * | 3/2009 | Huprikar | F16F 1/37 267/140.13 |
| 9,010,716 | B2 * | 4/2015 | Kobori | F16F 1/3713 248/635 |
| 9,366,311 | B2 * | 6/2016 | Gustavsson | F16F 1/3713 |
| 9,835,223 | B2 * | 12/2017 | Padios | F16F 15/08 |
| 9,897,158 | B2 * | 2/2018 | Ellen | B62D 33/0604 |
| 10,125,843 | B2 * | 11/2018 | Runge | F16F 15/046 |
| 2003/0183995 | A1 | 10/2003 | Edberg et al. | |
| 2013/0050515 | A1 | 2/2013 | Wu et al. | |
| 2013/0286473 | A1 | 10/2013 | Tsuji et al. | |
| 2013/0299669 | A1 | 11/2013 | Laurens | |
| 2015/0131982 | A1 * | 5/2015 | Starns | F16F 3/0876 396/7 |

OTHER PUBLICATIONS

International Search Report and Written Opinion for International Application No. PCT/EP2016/066521, dated Sep. 13, 2016.

* cited by examiner

VIBRATION DAMPING CONNECTOR AND USE OF THE VIBRATION DAMPING CONNECTOR

RELATED APPLICATIONS

This application is a national stage application under U.S.C. § 371 of PCT International Application No. PCT/EP2016/066521, filed Jul. 12, 2016, which claims foreign priority benefits under 35 U.S.C. § 119(a)-(d) or 35 U.S.C. § 365(b) of European application number 15179924.4, filed Aug. 6, 2015, the contents of each of which are incorporated herein by reference in their entireties.

FIELD OF THE INVENTION

The present invention relates to a vibration damping connector for reducing vibrations between a vibration prone system and an optical imaging system. Furthermore, use of the vibration damping connector in an optical system is disclosed.

TECHNICAL BACKGROUND

Within optics and optical instruments it is common to use a connector, also known as a C-mount. The connector may attach a vibration prone system, for example an Atomic Force Microscope (AFM), with a charge-coupled device (CCD) digital camera system with a cooling fan or an optical imaging system with motorized components such as e.g. a spinning disk. The connector is usually according to a known standard for optical imaging sensors that dictates the design of the mount shape and sensor distance with respect to the optical mount in optical imaging. At the time of filing the present application the connectors are according to the ISO 10935:2009. Sometimes the system or the optical imaging system is exposed to mechanical vibrations and/or noise, for example from the systems themselves or from the surrounding environment. This reduces the quality of the image and subsequently the data to be extracted.

One way to improve the quality may for example by using complex computer programs. However, there is a desire to improve the quality in other ways.

SUMMARY OF THE INVENTION

The object of the present invention is to provide a vibration damping connector that overcomes the above issues.

The invention is based on the insight that by having at least a two part connector where the parts are connected via shock absorbing elements vibrations and noise can be absorbed by the connector itself.

The invention relates to a vibration damping connector for reducing vibrations between a vibration prone system and an optical imaging system, said vibration damping connector comprising a first part adapted to be connected to said optical imaging system, a second part adapted to be connected to said vibration prone system, and at least one first shock absorbing element, a portion of said first part is arranged inside a portion of said second part along a central axis or a portion of said second part is arranged inside a portion of said first part along a central axis and said at least one flexible shock absorbing element is arranged between said first part and said second part, said vibration damping connector further comprises at least one fastening device for fastening said first part to said second part and said fastening device presses said first part to said second part via a second shock absorbing element.

By having the first and the second parts connected and fastened to each other with shock absorbing elements between them, vibrations can be absorbed by the shock absorbing elements. Hence, the vibrations from the vibration prone system are reduced or eliminated by the vibration damping connector such that the vibrations, which otherwise would transfer to the optical imaging system and cause reduced imaging quality are less than using a standard C-mount adapter/connector.

The vibration damping connector may connect an optical inverted microscope used in research, having an atomic force microscope (AFM) mounted on top of it, with a charge-coupled device (CCD) digital camera system with a cooling fan or an optical imaging system with motorized components such as a spinning disk.

By having the fastening device connecting the first and the second parts and pressing them together a correct distance of the optical sensor may be provided with respect to the optical instrument it is attached to. By having the two parts, i.e. the first and the second part, arranged with shock absorbing elements between them and in the fastening connection, i.e. when the fastening device presses the first part to the second part via the second shock absorbing element the two parts may be separated from each other, i.e. not in contact with each other. This provides electrical shielding. The at least one first shock absorbing element may be one large element or several smaller elements. The first and the second part may be made of metal, for example aluminium or stainless steel. However any other suitable material may be used. The parts may also be galvanized in black to avoid internal reflections of the bare material that would compromise image formation quality. The vibration damping connector may comprise several fastening devices arranged around the vibration damping connector or only one fastening device. If several fastening devices are used, they are preferably evenly distributed around the vibration damping connector in order to evenly distribute the pressure around the vibration damping connector. If one fastening device is used, it may be designed such that it evenly presses the two parts together. The centre axes of the two parts should be aligned.

According to at least one exemplary embodiment said fastening device comprises a first fastening portion attached to said first portion and a second fastening portion attached to said second portion and said first fastening portion and said second fastening portion are in contact with said second shock absorbing element and limits displacement along the central axis between of the first part and the second part. The first and the second fastening portions which are in contact with the second shock absorbing element prevent the two parts from separating. If there are several fastening devices they are preferably evenly arranged around the vibration damping connector such that the parts are pressed evenly together all around the vibration damping connector. This way it is ensured that the centre lines of each part are aligned. If they are not aligned the image formed on the imaging system may be cut/distorted This since optical systems that do not have their "optical axis" aligned, suffer from various optical aberrations in the final image.

According to at least one exemplary embodiment said first and/or said second shock absorbing element is made of a shock absorbing material. The shock absorbing material may for example be silicone rubber, silicone gel, urethane, natural rubber, soft rubber, neoprene, styrene-butadiene rubber compound, polyethylene foam or Polyurethane foam. The choice depends on material compression, weight, and resistance to twist and shearing. The first and the second shock absorbing element may be made of the same material or different materials. The first shock absorbing element may be a pad.

According to at least one exemplary embodiment said first part comprises an inner conical shape and said second part comprises a matching outer conical shape.

According to at least one exemplary embodiment said first part comprises an outer conical shape and said second part comprises a matching inner conical shape. The matching conical shapes facilitate the assembly of the vibration damping connector. This since the conical shape guides the two parts into a correct position. The conical design together with the first shock absorbing element also facilitates that the two parts are arranged in a correct position in the direction of the central axis in order to get a correct distance of the optical sensor with respect to the optical instrument it is attached to.

According to at least one exemplary embodiment said first part is a female part and said second part is a male part.

According to at least one exemplary embodiment said first part is a male part and said second part is a female part.

According to at least one exemplary embodiment said first part and said second part are out of contact from each other. This provides electrical shielding.

According to at least one exemplary embodiment said first shock absorbing element is arranged to said first part by using adhesive.

According to at least one exemplary embodiment said first shock absorbing element is arranged to said second part by using adhesive. By attaching the at least one first shock absorbing element to the first or to the second part the first shock absorbing element is arranged in a correct position and it may be an advantage when assembling the two parts together.

According to at least one exemplary embodiment said second part comprises an end which is c-mount compatible in order to connect to said vibration prone system. That is, the end or the end portion of the second part is made in accordance with the standard which specifies the dimensions of a thread mount connection type C for a microscope imaging exit port (other than a monocular or binocular viewing tube) and the position of the image plane, The standard is at the time of filing the application ISO 10935: 2009.

According to a second aspect of the invention the vibration damping connector described above may be used in an optical system between a vibration prone system and an optical imaging system.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise.

Other objectives, features and advantages of the present invention will appear from the following detailed disclosure, as well as from the drawings.

BRIEF DESCRIPTION OF THE DRAWINGS

The above, as well as additional objects, features and advantages of the present invention, will be better understood through the following illustrative and non-limiting detailed description of exemplary embodiments of the present invention, with reference to the appended drawings, where the same reference numerals will be used for similar elements, wherein.

All the figures are highly schematic, not necessarily to scale, and they show only parts which are necessary in order to elucidate the invention, other parts being omitted or merely suggested.

DETAILED DESCRIPTION OF EXEMPLARY EMBODIMENTS

An embodiment of the invention will be described in more detail in the following with reference to the accompanying drawings.

Figure 1:
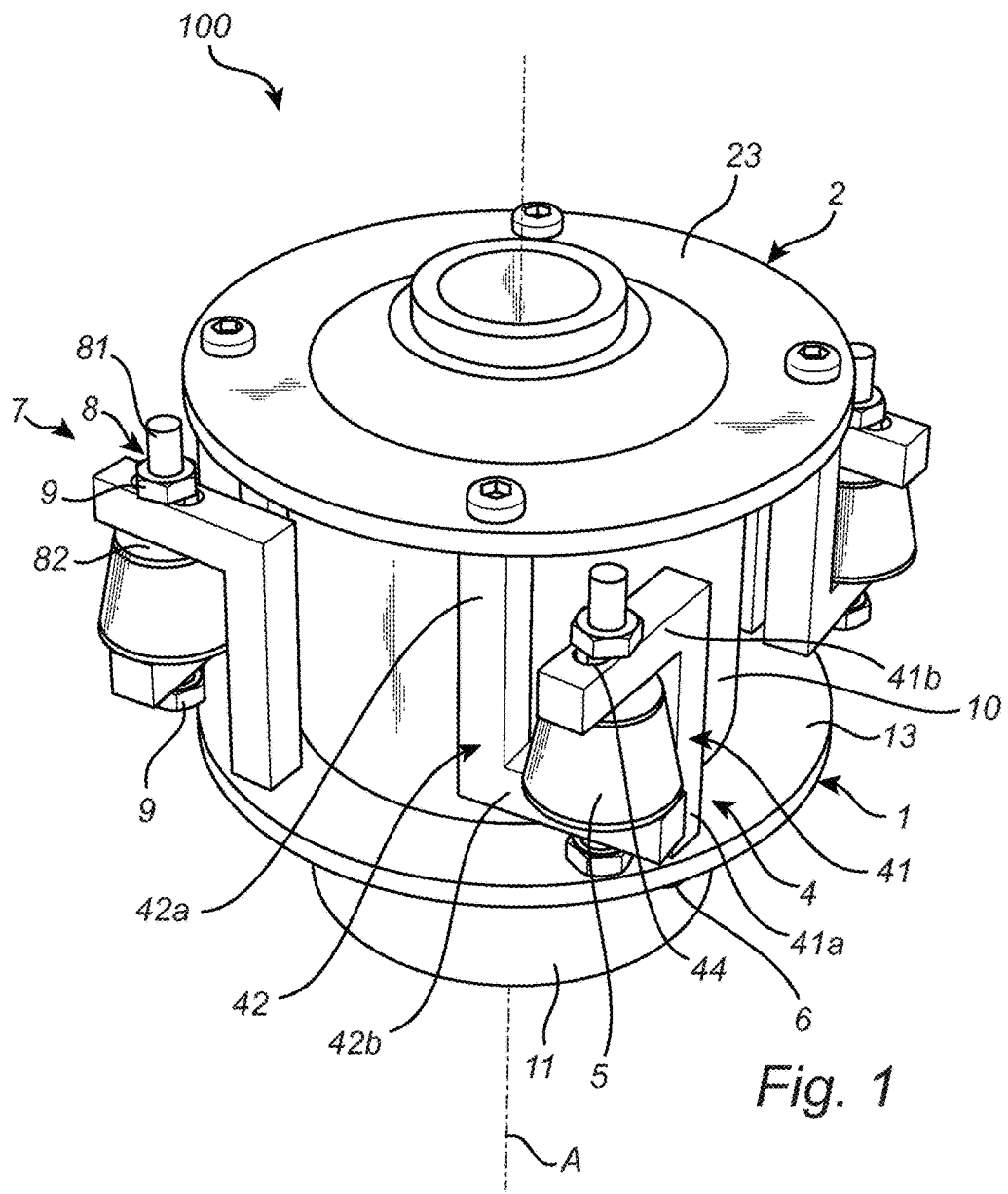
FIG. 1 shows a vibration damping connector according to an embodiment of the invention in perspective.
Figure 2:
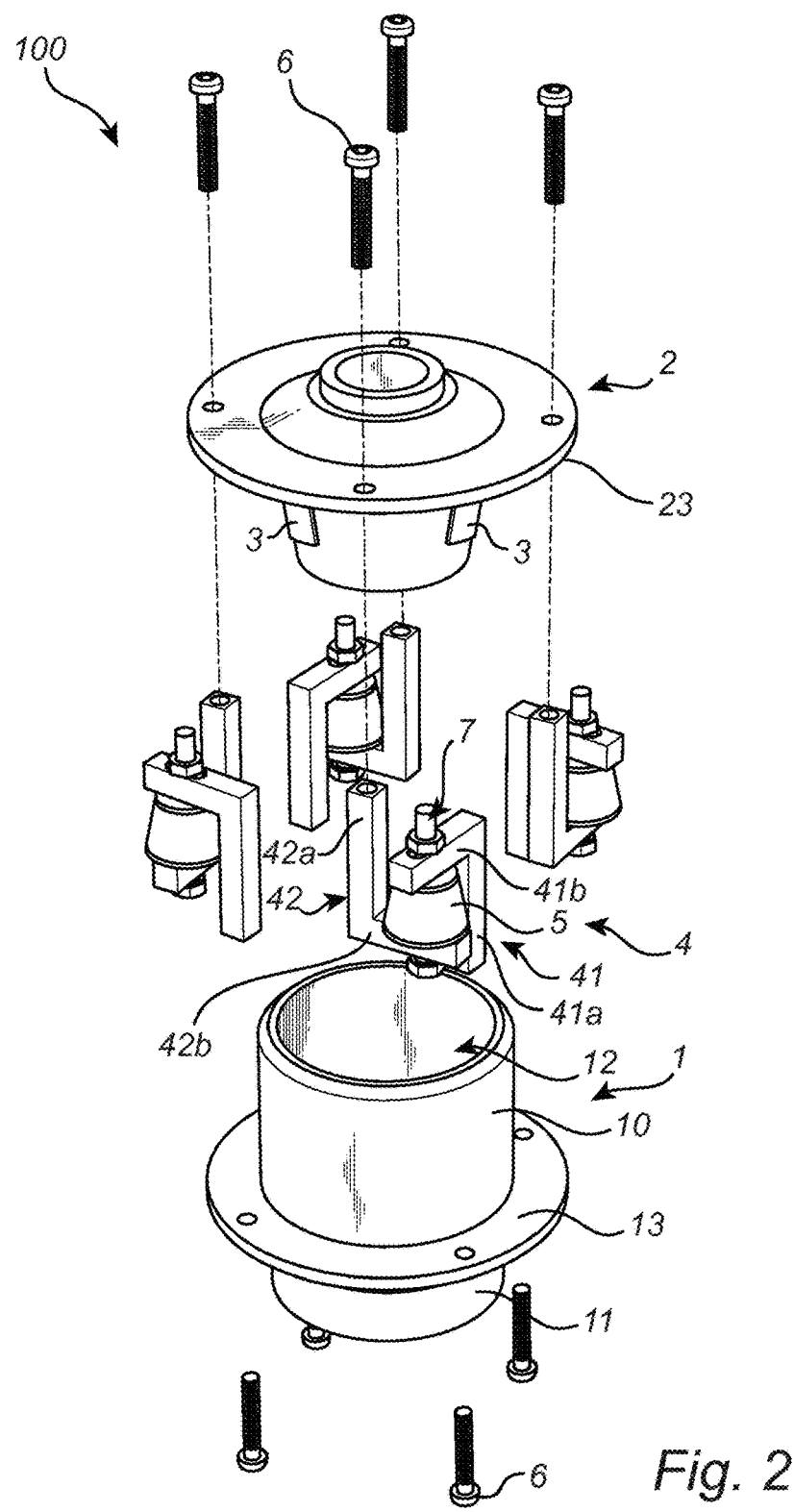
FIG. 2 shows the vibration damping connector in FIG. 1 in an exploded view and in perspective.
Figure 3:
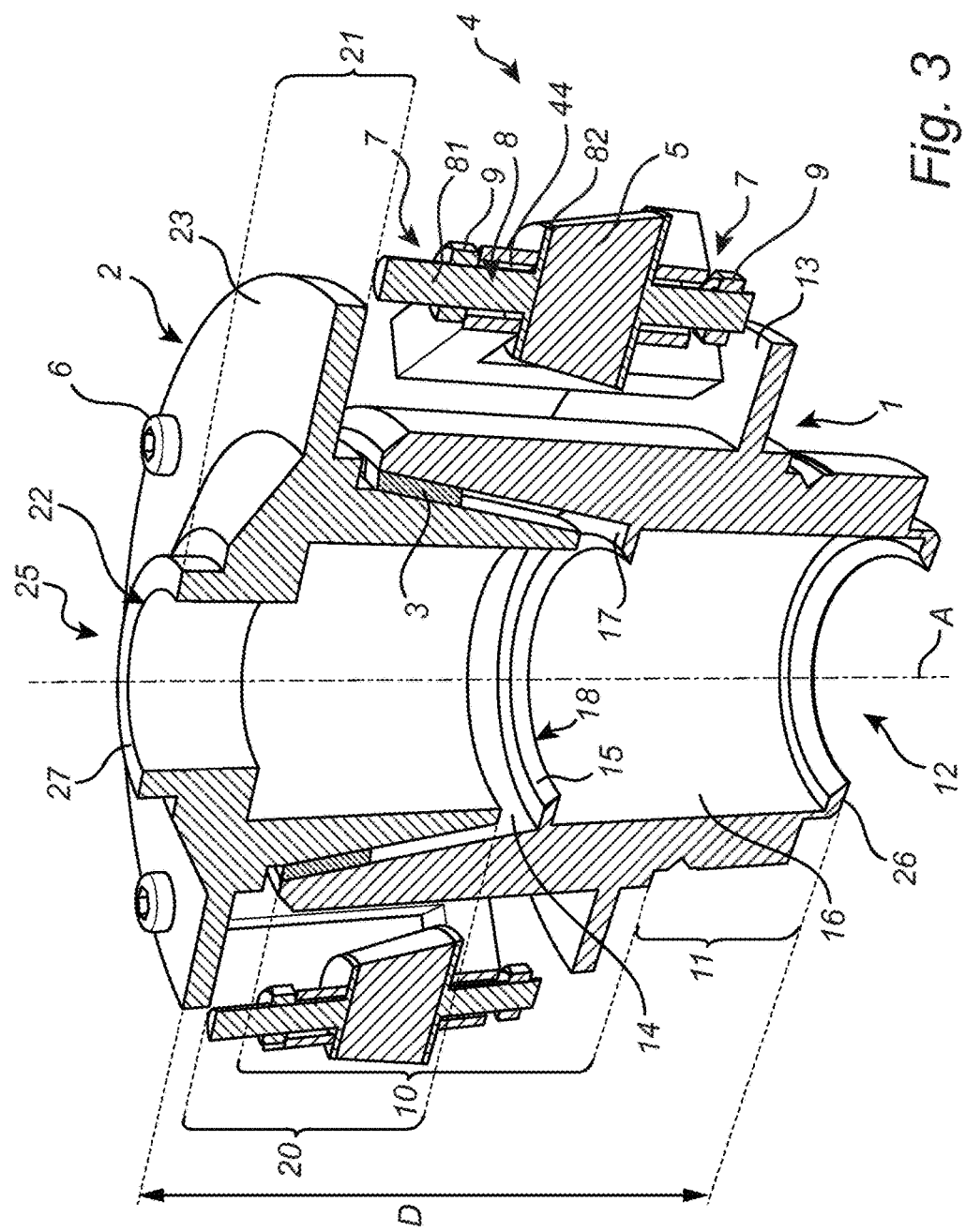
FIG. 3 shows the vibration damping connector in FIG. 1 in a cross-sectional view.

FIGS. 1, 2 and 3 show a vibration damping connector 100, which can take up vibration and/or noise between two systems. The FIGS. 1, 2 and 3 will be described together. The vibration damping connector 100 may for example take up vibration and/or noise between a vibration prone system, for example a differential spinning disk, and/or an optical Imaging system, for example an microscope.

The vibration damping connector 100 comprises a first part 1 and a second part 2, where the second part 2 is inserted into the first part 1 along a common central axis A. The first part 1 is a female part 1 and the second part 2 is a male part 2.

The first part 1 comprises a main portion 10 and an end portion 11. The main portion 10 comprises an outer cylindrical shape with a through hole 12 (see FIG. 3) having a first portion 14, a second portion 15 and a third portion 16. The first portion 14 comprises a tapering shape, i.e. an inner conical shape. In this first portion 14 the second part 2 will be received. The second portion 15 is formed by an inner flange 17 which defines an opening 18 which has a smaller diameter than the largest and smallest diameter of the first conical portion 14. The third portion 16 is a cylindrical portion.

The end portion 11 is compatible with an apparatus, for example an optical imaging system and connects the vibration damping connector 100 with the apparatus. This can be done in any known suitable way.

The second part 2 comprises a main portion 20 and an end portion 21. The main portion 20 of the second part 2 comprises an outer conical shape, which is matching the first portion 14, i.e. the inner conical shape of the main portion 10 of the first portion 1. The end portion 21 of the second part 2 is according to the standard which specifies the dimensions of a thread mount connection type C for a microscope imaging exit port (other than a monocular or binocular viewing tube) and the position of the image plane, i.e. ISO 10935:2009. The main portion 20 and the end portion 21 of the second part 2 is also provided with a through hole 22. When the two parts 1, 2, i.e. the first part 1 and the second part 2 are arranged to each other their centre axes are aligned, and a through hole 25 is extending through the whole vibration damping connector 100. The inner design, i.e. the inner diameters and distances, of the vibration damping connector 100, i.e. the through hole 25, is dependent on the microscope it shall be attached to. The inner design of the vibration damping connector 100 may be adapted to different microscopes. The inner design restricts light rays hitting the microscope optical detectors (e.g. CCD camera or DSD as described in connection with FIG. 4). They are referred to in geometrical optics as "optical stops", since they restrict the optical light rays passing through the optical systems. Adaption of the vibration damping connector 100 to different microscope manufacturers will require different "optical stop" designs.

On the male part 2 are four first shock absorbing elements 3 arranged (see FIG. 2, only two are shown). The four shock absorbing elements are four pads attached to the second part. The shock absorbing elements 3 may for example be made of a silicone rubber sheet, a silicone gel sheet, a polyethylene foam sheet, polyurethane foam sheet or an elastomer having dampening material properties. The shock absorbing elements 3 are attached to the second part 2 by double-stick tape, may however be glued to the second part 2 or the first part 1 or even loosely arrange between the second part 2 and the first part 1. The first shock absorbing elements 3 separate the second part 2 and the first part 1 from each other, i.e. they are not in contact with each other. The four first shock absorbing elements are evenly distributed around the vibration damping connector 100. The number of first shock absorbing elements is not limited to being four, they may be more or less. For example may it be one which extends all around the second part 2.

The first part 1 comprises a flange 13 which extends perpendicular to the central axis of the first part. The second part 2 comprises a similar flange 23 which is part of the end portion 21 of the second part 2.

Four fastening devices 4 connect and press the first part 1 to the second part 2 to a correct position. The end surface 26 of the end portion 11 of the first part 1 and the end surface 27 of the end portion 21 of the second part 2 are arranged essentially parallel to each other and they are arranged perpendicular to the centre axis A. The end surfaces 26, 27 are arranged at a distance D from each other to provide correct distancing of an optical sensor ( for example the DSD) with respect to the optical instrument, for example the optical microscope with AFM attached to it (see FIG. 4). The distance D is a set distance D, which depends on the optics on either side of the vibration damping device 100

The fastening devices 4 are evenly distributed around the vibration damping connector 100. They are not limited to being four fastening devices 4, they may be more or less.

One fastening device 4 comprises a first fastening portion 41. The first fastening portion 41 having an L-shape, i.e. two legs 41a, 41b attached perpendicular to each other. One end of one of legs 41a of the L-shaped first fastening portion 41 is attached to the flange 13 of the first portion 1 by a fastener 6, i.e. a screw which threadedly engages the first fastening portion 41a.

The fastening device 4, further comprises a second fastening portion 42 having similar L-shape as the first fastening portion 41. One end of the legs 42a of the L-shaped second fastening portion 42 is attached to the flange 23 of the second portion 2 by a fastener 6, i.e. a screw.

The second leg 41b of the L-shaped first fastening portion 41 is in contact with a second shock absorbing element 5 and the second leg 42b of the L-shaped second fastening portion 42 is in contact with the same second shock absorbing element 5 opposite the second leg 41b of the L-shaped first fastening portion 41. They are both in contact with the second shock absorbing element 5 via distance regulators 7 and together they limit displacement along the central axis A between the first part 1 and the second part 2.

The distance regulators 7 each comprises a nut 9 and a mushroom shaped element 8 having a threaded stem 81 and a head 82. The threaded stem 81 protrudes through a hole 44 in the second leg 41b, 42b of either the first or the second fastening portion 41, 42 such that the head 82 is in contact with the second shock absorbing element 5. The head 82 is glued to the second shock absorbing element 5. The nut 9 threadedly engages the threaded stem 81 of the mushroom shaped element 8. Depending on how much a nut 9 is screwed onto the threaded stem 81 the pressure and the distance between the first and the second part can be regulated. The distance regulators 7 also influence the overall damping factor.

The second shock absorbing element 5 may be made of silicone rubber, silicone gel, urethane, natural rubber, soft rubber, neoprene or styrene-butadiene rubber compound or any other suitable material.

The second shock absorbing element 5 has a conical shape. The head 82 of the mushroom shaped element 8 which is in contact with the second leg 42b of the second fastening portion has a diameter, which is essentially equal with the larger diameter end of the second conical shaped absorbing element 5. The head 82 of the mushroom shaped element 8 which is in contact with the second leg 41b of the first fastening portion has a diameter, which is essentially equal with the smaller diameter end of the second conical shaped absorbing element. The second shock absorbing element 5 is not limited to being conical, it may have any suitable shape. The diameter or the outer contour of the head 82 of the mushroom shaped element is not limited to have the same dimension as the second shock absorbing element 5.

When one of the systems, to which the vibration damping connector 100 may be connected to, is exposed to vibration or noise or creates the vibrations itself the vibration damping connector 100 will absorb the vibration or noise through the first and the second shock absorbing elements 3, 5.

The amount of vibration the vibration damping connector 100 can absorb depends on the material of the shock absorbing elements, the shape of the shock absorbing elements and the number of shock absorbing elements.

It has been described that the first part 1 is a female part and the second part 2 is a male part. However, it may be the other way around. That is, the first part 1 may be the male part and the second part 2 may be the female part.

The vibration damping connector 100 could for example be used in a combined microscopy platform 200 (see FIG. 4) based on fluorescence optical sectioning microscopy through aperture correlation microscopy with a Differential Spinning Disk (DSD) 201 and nano-mechanical mapping with an Atomic Force Microscope (AFM) 202. The illumination scheme of the DSD microscope unit, contrary to standard single or multi-point confocal microscopes, provides a time-independent illumination of the AFM cantilever. This enables an easy integration of simultaneously recorded fluorescence microscopy data with scanning probe microscopy data acquired with standard probes.

Figure 4:
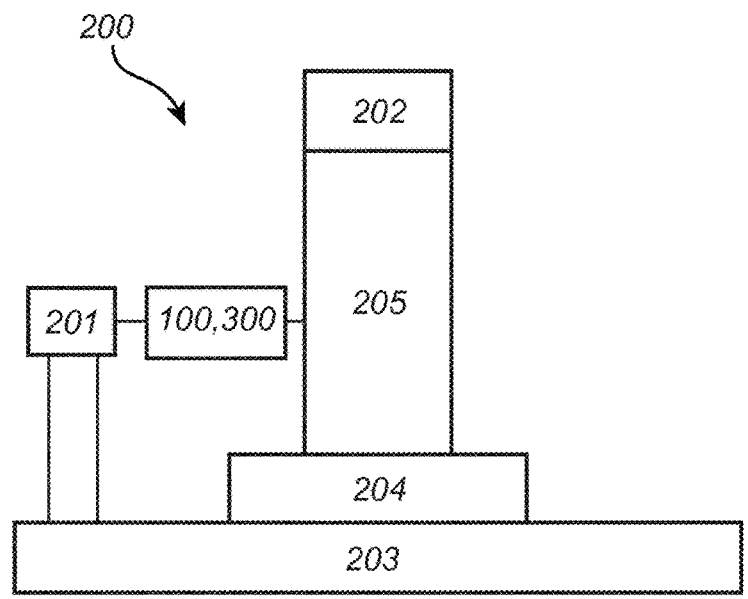
FIG. 4 shows a set up of an experimental test.
Figure 5:
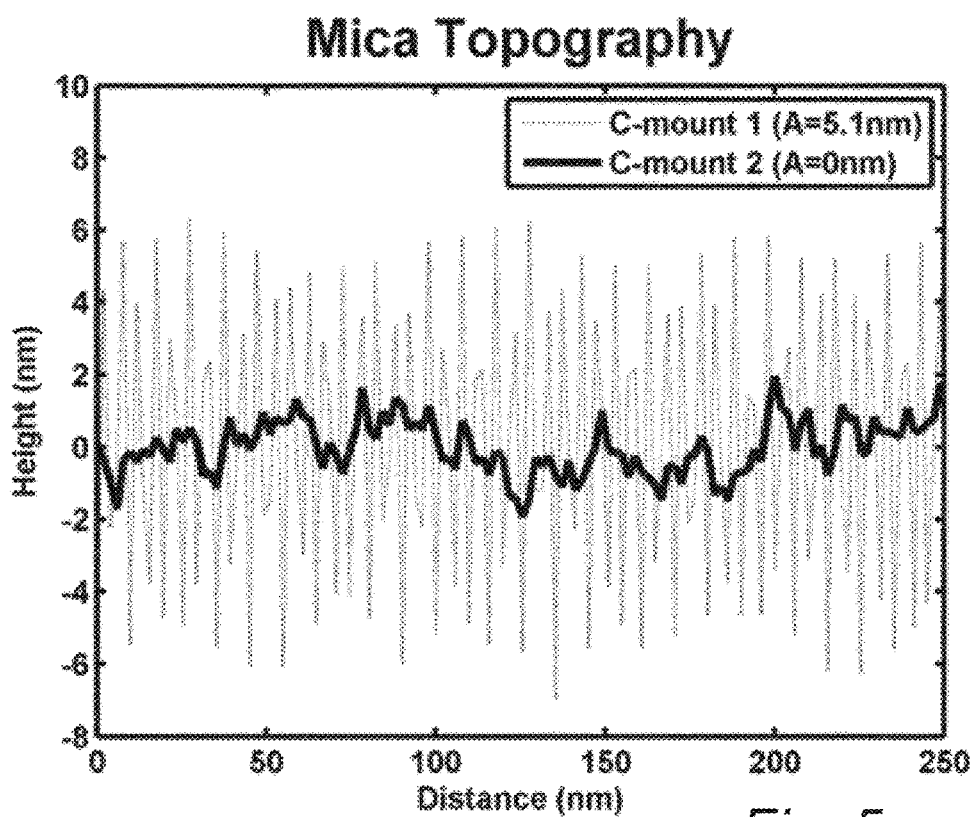
FIG. 5 shows a graph of the results of the experimental test made in the set up shown in FIG. 4.

Tests have been made in regard to this example. FIG. 4 schematically displays the experimental set-up for integration of a DSD imaging platform 201 and an advanced bioscience AFM system 202 capable of QI (Quantitative Imaging (JPK Instruments, Germany). Different connectors 100, 300 connecting the DSD 201 with the inverted optical microscope 205 having an Atomic Force Microscope (AFM) 202 mounted on top of it were used when making the tests. One test was made using the vibration damping connector 100 (C-mount 2) described in connection with the FIGS. 1-3. One test was made using a Nikon C-mount (C-mount 1 (A=5.1 nm) 300. The result is shown in FIG. 5. The entire set-up, see FIG. 4, was mounted on an ultra-low noise floor 203 constructed to comply with the NIST-A vibration specifications. (H. Amick, M. Gendreau, T. Busch, and C. Gordon, "Evolving criteria for research facilities: vibration," Proceeding of SPIE5933, 593303-593313 (2005)). An additional noise vibration platform 204 (i4, Accurion GmbH, Göttingen, Germany) was present for shielding noise transfer between the DSD and AFM. This platform 204 was loaded with the inverted optical microscope 205 (TI-S/L100, Nikon Instruments Europe B.V., Amsterdam, The Netherlands) equipped with an atomic force microscope 202 dedicated for the life sciences (NanoWizard 3, JPK Instruments, Berlin, Germany). A dedicated condenser lens (not shown) with an extra long working distance of 75 mm (T1-CELWD ELWD, Nikon Instruments Europe B. V., Amsterdam, The Netherlands) was installed to comply with the height of the AFM unit. Fast automated objective focus control and scanning is provided by a piezo unit (P-725 PIFOC®, Physik Instrument, Karlsruhe, Germany) (not shown). For optimal fluorescence detection a high numerical aperture objective (not shown) has been used for the measurements reported (CFI Plan Apo VC 60X Oil, Nikon Instruments Europe B. V., Amsterdam, The Netherlands). A metal halide light source (not shown) with built-in fluorescence excitation filter (AMH-200, Andor Technology, Belfast, Northern Ireland) wheel provides excitation light for the DSD unit (DSD generation-1, Andor Technology, Belfast, Northern Ireland). An interline CCD camera (Andor Clara, Andor Technology, Belfast, Northern Ireland) (not shown) was used for DSD image capture. A standard monochrome CCD camera (ProgRes®MFCool, Jenoptik, Jena, Germany) (not shown) was coupled to a microscope port for AFM cantilever laser spot alignment.

The experimental set-up suffers from AFM cantilever perturbation induced by the Differential Spinning Disk (DSD) unit 201 which influence the quality of the AFM image. This perturbation has been traced to originate entirely from the DSD spinning disk motion. This perturbation can be reduced by using the vibration damping connector 100 described in connection with FIGS. 1 to 3 which at one end is connected to the Differential Spinning Disk (DSD) 201 and at the other end with the inverted optical microscope 205 having the atomic force microscope (AFM) 202 mounted on top of it, as shown in FIG. 4. FIG. 5 shows contact mode 250 nm AFM line scans of a high quality mica substrate measured in a liquid medium with a standard Nikon C-mount (C-mount 1 (A=5.1 nm)), and a vibration damping connector described in connection with FIGS. 1-3 (C-mount 2 (A=0 nm)) as mechanical connection between the DSD 201 and the inverted optical microscope 205 in FIG. 4. The A in (A=3.1 nm) and (A=0 nm) stands for noise amplitude and as can be observed it is comprised of a 100 Hz sinusoidal wave with amplitude A expressed in nanometers (nm).

As shown in the diagram in FIG. 5 the vibrations have been reduced using the vibration damping connector 100 described in connection with FIGS. 1-3. From the AFM image the height values of the surface being measured can be obtained. In this case, from an AFM topography image of a mica substrate in liquid medium and using the different connections/mounts they obtained the mica surface height measured by the AFM over a distance of 250 nm. For a clear comparison of the results the values were joined to be obtained on the same graphic. As can be seen the C-mount 2, reduces the noise in the AFM image to a larger extent as compared to when C-mount 1 was tested.

In the above description, the vibration damping connector and the use of the vibration damping connector have been described to reduce vibrations between a vibration prone system and an optical imaging system. It is, however, realized that the vibration damping connector may be used to connect a vibration prone system to any vibration sensitive system. Hence, the transfer of vibrations from the vibration prone system to the vibration sensitive system is reduced by the vibration damping connector.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A vibration damping connector for reducing vibrations between a vibration prone system and an optical imaging system, said vibration damping connector comprising:
    a first part configured to be connected to said optical imaging system, the first part having a first part through hole;
    a second part configured to be connected to said vibration prone system, the second part having a second part through hole;
    at least one first shock absorbing element, wherein a portion of said first part is arranged inside a portion of said second part along a central axis or a portion of said second part is arranged inside a portion of said first part along a central axis, and wherein said at least one first shock absorbing element is arranged in a radial interspace formed between said portion of said first part and said portion of said second part thereby allowing absorption of radial forces;
    at least one fastening device fastening said first part to said second part and said fastening device pressing said first part to said second part along the central axis via a second shock absorbing element, wherein
    the second shock absorbing element allows absorption of axial forces and is displaced radially, in relation to the central axis, from the at least one first shock absorbing element,
    said fastening device comprises a distance regulator allowing regulation of displacement between the first and second parts along the central axis,
    the second shock absorbing element is formed separately from said fastening device, and
    the first part through hole of the first part and the second part through hole of the second part form a through hole extending through the vibration damping connector along the central axis.

2. The vibration damping connector according to claim 1, wherein said fastening device comprises a first fastening portion attached to said first portion and a second fastening portion attached to said second portion and said first fastening portion and said second fastening portion are in contact with said second shock absorbing element and said fastening device limits displacement along the central axis of the first part relative to the second part.

3. The vibration damping connector according to claim 1, wherein at least one of said first and said second shock absorbing element is made of a shock absorbing material.

4. The vibration damping connector according to claim 1, wherein said first part comprises an inner conical shape and said second part comprises a matching outer conical shape.

5. The vibration damping connector according to claim 1, wherein said first part comprises an outer conical shape and said second part comprises a matching inner conical shape.

6. The vibration damping connector according to claim 1, wherein said first part is a female part and said second part is a male part.

7. The vibration damping connector according to claim 1, wherein said first part is a male part and said second part is a female part.

8. The vibration damping connector according to claim 1, wherein said first part and said second part are out of contact from each other.

9. The vibration damping connector according to claim 1, wherein said first shock absorbing element is arranged to said first part by using adhesive.

10. The vibration damping connector according to claim 1, wherein said first shock absorbing element is arranged to said second part by using adhesive.

11. The vibration damping connector according to claim 1, wherein said second part comprises an end which is c-mount compatible in order to connect to said vibration prone system.

12. Use of a vibration damping connector according to claim 1 in an optical system between a vibration prone system and an optical imaging system.

13. Optical system comprising a vibration prone system, an optical imaging system and a vibration damping connector according to claim 1.

14. The vibration damping connector according to claim 1, wherein
the portion of said first part is arranged to axially overlap the portion of said second part along the central axis, and
the at least one first shock absorbing element is arranged in a radial interspace formed by the axial overlap between the portion of the first part and the portion of the second part.

15. The vibration damping connector according to claim 1, wherein
the portion of the second part is arranged to axially overlap the portion of the first part along the central axis, and
the at least one first shock absorbing element is arranged in a radial interspace formed by the axial overlap between the portion of the second part and the portion of the first part.

16. A vibration damping connector for reducing vibrations between a vibration prone system d an optical imaging system, said vibration damping connector comprising:
a first part configured to be connected to said optical imaging system, the first part having a first part through hole;
a second part configured to be connected to said vibration prone system, the second part having a second part through hole;
at least one first shock absorbing element, wherein a portion of said first part is arranged inside a portion of said second part along a central axis or a portion of said second part is arranged inside a portion of said first part along a central axis, and wherein said at least one first shock absorbing element is arranged in a radial interspace formed between said portion of said first part and said portion of said second part thereby allowing absorption of radial forces;
at least one fastening device fastening said first part to said second part and said fastening device pressing said first part to said second part along the central axis via a second shock absorbing element, wherein
the second shock absorbing element allows absorption of axial forces,
said fastening device comprises a distance regulator allowing regulation of displacement between the first and second parts along the central axis,
the second shock absorbing element is formed separately from said fastening device,
the first part through hole of the first part and the second part through hole of the second part form a through hole extending through the vibration damping connector along the central axis, and
said first part comprises an inner conical shape and said second part comprises a matching outer conical shape.

17. A vibration damping connector for reducing vibrations between a vibration prone system and an optical imaging system, said vibration damping connector comprising:
a first part configured to be connected to said optical imaging system, the first part having a first part through hole;
a second part configured to be connected to said vibration prone system, the second part having a second part through hole;
at least one first shock absorbing element, wherein a portion of said first part is arranged inside a portion of said second part along a central axis or a portion of said second part is arranged inside a portion of said first part along a central axis, and wherein said at least one first shock absorbing element is arranged in a radial interspace formed between said portion of said first part and said portion of said second part thereby allowing absorption of radial forces;
at least one fastening device fastening said first part to said second part and said fastening device pressing said first part to said second part along the central axis via a second shock absorbing element, wherein
the second shock absorbing element allows absorption of axial forces,
said fastening device comprises a distance regulator allowing regulation of displacement between the first and second parts along the central axis,
the second shock absorbing element is formed separately from said fastening device,
the first part through hole of the first part and the second part through hole of the second part form a through hole extending through the vibration damping connector along the central axis, and
said first part comprises an outer conical shape and said second part comprises a matching inner conical shape.

* * * * *